(12) United States Patent
Lofgren et al.

(10) Patent No.: US 11,601,509 B1
(45) Date of Patent: Mar. 7, 2023

(54) SYSTEMS AND METHODS FOR IDENTIFYING ENTITIES BETWEEN NETWORKS

(71) Applicant: Stripe, Inc., San Francisco, CA (US)

(72) Inventors: Peter Lofgren, Palo Alto, CA (US); Pranav Dandekar, Palo Alto, CA (US); Ashish Goel, Stanford, CA (US); Andrew Paul Tausz, Toronto (CA)

(73) Assignee: Stripe, Inc., San Francisco, CA (US)

( * ) Notice: Subject to any disclaimer, the term of this patent is extended or adjusted under 35 U.S.C. 154(b) by 415 days.

(21) Appl. No.: 15/825,044

(22) Filed: Nov. 28, 2017

(51) Int. Cl.
*G06Q 50/00* (2012.01)
*H04L 67/306* (2022.01)
*G06N 7/00* (2006.01)
*H04L 67/50* (2022.01)

(52) U.S. Cl.
CPC .......... *H04L 67/306* (2013.01); *G06N 7/005* (2013.01); *G06Q 50/01* (2013.01); *H04L 67/535* (2022.05)

(58) Field of Classification Search
USPC ........................................................ 705/319
See application file for complete search history.

(56) References Cited

U.S. PATENT DOCUMENTS

| | | | |
|---|---|---|---|
| 7,249,094 B2 | 7/2007 | Levchin et al. | |
| 7,856,411 B2 * | 12/2010 | Darr .................. | G06Q 10/10 706/45 |
| 8,560,385 B2 * | 10/2013 | Atazky .................. | H04L 51/32 705/14.11 |
| 9,225,676 B1 * | 12/2015 | Shoham .................. | H04L 51/32 |
| 9,294,497 B1 * | 3/2016 | Ben-Or ............... | H04L 63/1433 |
| 9,787,705 B1 * | 10/2017 | Love ....................... | G06F 16/358 |
| 2009/0034805 A1 * | 2/2009 | Perlmutter .......... | G06F 16/5838 382/118 |
| 2010/0274815 A1 * | 10/2010 | Vanasco ............... | G06Q 10/107 707/798 |
| 2011/0213741 A1 * | 9/2011 | Shama ................... | G06N 20/00 706/13 |
| 2012/0166553 A1 * | 6/2012 | Rubinstein ............. | G06Q 50/01 709/206 |
| 2013/0097093 A1 * | 4/2013 | Kolber ............... | G06Q 10/1053 705/321 |

(Continued)

OTHER PUBLICATIONS

Peled, Olga, "Matching Entities Across Online Social Networks", Nov. 2014, https://arxiv.org/abs/1410.6717 (Year: 2014).*

(Continued)

*Primary Examiner* — Sangeeta Bahl
*Assistant Examiner* — Rebecca R Novak
(74) *Attorney, Agent, or Firm* — BakerHostetler

(57) ABSTRACT

Described herein are systems and methods for predicting whether an entity associated with a profile in one network is the same entity that is associated with a profile in a second network, which networks may represent networks from different network services or may represent networks from the same network service. In embodiments, network graph features, including nodes and connections, may be used to predict a probability that the profiles in the two networks should be matched. In embodiments, additional or different factors may be included in the predicted probability, such as homophily, match probabilities of seed nodes, match probabilities of attribute-matched nodes, attribute-attribute co-occurrence probabilities, and the like.

20 Claims, 12 Drawing Sheets

(56) References Cited

U.S. PATENT DOCUMENTS

| | | | | |
|---|---|---|---|---|
| 2013/0110641 A1* | 5/2013 | Ormont | ............... | G06Q 30/0251 705/14.66 |
| 2013/0325947 A1* | 12/2013 | Rigdon | ................. | G06F 40/226 709/204 |
| 2014/0129552 A1* | 5/2014 | Sinha | ................ | G06F 16/24578 707/724 |
| 2014/0297740 A1* | 10/2014 | Narayanan | ............. | G06Q 30/02 709/204 |
| 2015/0134745 A1* | 5/2015 | Posse | ....................... | H04L 67/22 709/204 |
| 2015/0213370 A1* | 7/2015 | Chakrabarti | ............ | G06N 7/005 706/52 |
| 2016/0034462 A1* | 2/2016 | Brewer | ............... | G06F 16/9024 707/734 |
| 2016/0034463 A1* | 2/2016 | Brewer | ................... | H04L 43/12 707/734 |
| 2016/0277526 A1* | 9/2016 | Bullock | ................ | H04L 67/306 |
| 2016/0342684 A1* | 11/2016 | Diaz | ....................... | G06F 16/337 |
| 2017/0063620 A1* | 3/2017 | Bedathur Jagannath | .................... | H04L 41/12 |
| 2017/0201851 A1* | 7/2017 | Huang | ..................... | G06F 16/29 |
| 2017/0235836 A1* | 8/2017 | Wang | ...................... | G06Q 50/01 707/730 |
| 2017/0286539 A1* | 10/2017 | Smith | ..................... | G06F 16/95 |
| 2017/0316519 A1* | 11/2017 | Wang | ................... | G06F 16/9574 |
| 2018/0060974 A1* | 3/2018 | Liu | ........................ | G06Q 50/01 |
| 2019/0114373 A1* | 4/2019 | Subbian | ................. | G06N 5/046 |

OTHER PUBLICATIONS

Shlens, Jon "A Tutorial on Principal Component Analysis", Mar. 25, 2003, https://www.cs.princeton.edu/picasso/mats/PCA-Tutorial-Intuition_jp.pdf (Year: 2003).*

N. Vesdapunt et al, Identifying Users in Social Networks with Limited Information, Computer Science Department, Stanford University, Oct. 2014, URL:<http://ilpubs.stanford.edu:8090/1116/1/findusers_TR.pdf> (48 pgs).

Patrick, J.,"How Facebook Knows What You Look Like", Jul. 9, 2015, <URL:http://time.com/3951006/facebook-visual-recognition/> (2pgs).

Amos et al.,"OpenFace: A general-purpose face recognition library with mobile applications", Jun. 2016, <URL:http://reports-archive.adm.cs.cmu.edu/anon/2016/CMU-CS-16-118.pdf/> (20pgs).

Schroff et al.,"FaceNet: A Unified Embedding for Face Recognition and Clustering", Jun. 17, 2015, <URL:https://arxiv.org/pdf/1503.03832v3.pdf/> (10 pgs).

* cited by examiner

200

205 — Given a query node from a first network and a set of candidate nodes from a second network, for each candidate node, predict a probability that an entity associated with the query node is a different entity than the entity associated with the candidate node using graph features to gauge correspondence between the query and the candidate node 210 — Responsive to a candidate node having predicted probability below a threshold level, assume the entity associated with the query node in the first network is the same entity that is associated with the candidate node in the second network

Given an identifier (e.g., name) for a query profile in a first social network, identify a set of candidate profiles in a second network that match (e.g., identical match or close match) the identifier ⟶ 305

FIG. 3

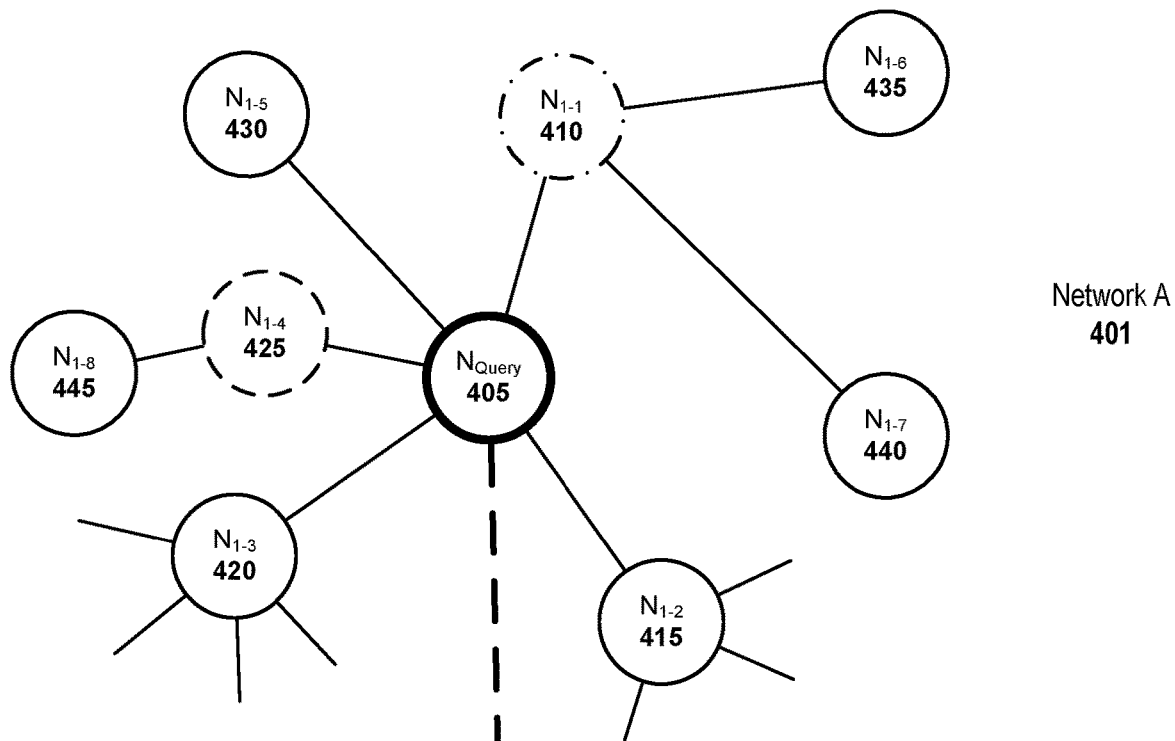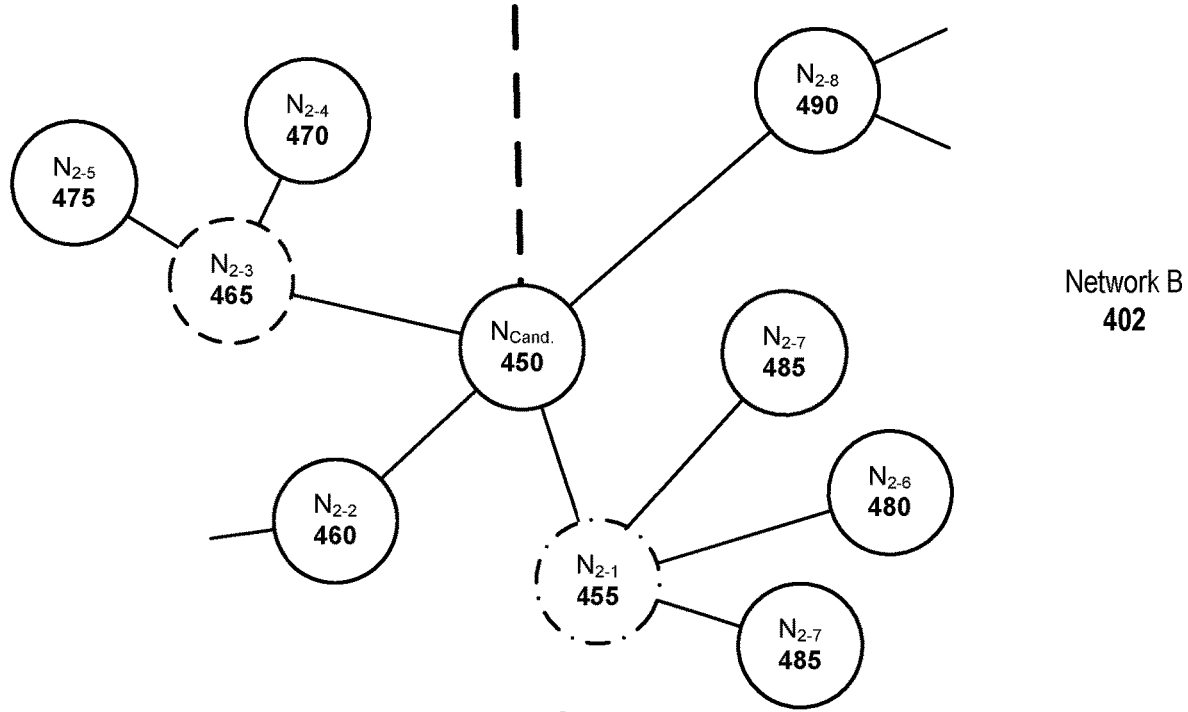
FIG. 4

500

```
┌─────────────────────────────────────────────────┐
│ Given a set of seed nodes comprising one or      │
│ more sets of matched nodes, each set of matched  │
│ nodes comprising a first node from the first     │
│ network associated with an entity and a          │──╱─ 505
│ second node from the second networked            │
│ associated with the same entity, determine a     │
│ first score using connections of seed nodes to   │
│ the candidate node and to the query node         │
└─────────────────────────────────────────────────┘
                         │
                         ▼
┌─────────────────────────────────────────────────┐
│ Given a set of nodes comprising one or more      │
│ sets of attribute-matched nodes, each set of     │
│ attribute-matched nodes comprising a node        │
│ from the first network and a node from the       │
│ second network that share an attribute and       │──╱─ 510
│ wherein the nodes in the set of nodes are not    │
│ included in the set of seed nodes, determine a   │
│ second score using connections of attribute-     │
│ matched nodes to the candidate node and to       │
│ the query node                                   │
└─────────────────────────────────────────────────┘
                         │
                         ▼
┌─────────────────────────────────────────────────┐
│ Using the first score and the second score to    │
│ obtain a final score that represents a           │
│ probability that an entity associated with the   │──╱─ 515
│ query node is a different entity than an entity  │
│ associated with the candidate node               │
└─────────────────────────────────────────────────┘
                         │
                         ▼
┌─────────────────────────────────────────────────┐
│ Responsive to a candidate node having a final    │
│ score that is below a threshold level, assign    │
│ the entity associated with the query node in     │──╱─ 520
│ the first network is the same entity that is     │
│ associated with the candidate node in the        │
│ second network                                   │
└─────────────────────────────────────────────────┘
```

Weight the combined probability by the number of nodes in the query node's network that share a profile attribute (e.g., name) with the query node to obtain a predicted probability that the entity associated with the query node is a different entity than the entity associated with the candidate node ⟋ 705

Extend to consider seed nodes that are within *x* hops from the query node and *y* hops from a candidate node — 805

905 — Given a set of seed nodes comprising one or more sets of matched nodes, each set of matched nodes comprising a first node from the first network associated with an entity and a second node from the second networked associated with the same entity, determine a first score using connections of seed nodes to the candidate node and to the query node 910 — Given a set of nodes comprising one or more sets of attribute-matched nodes, each set of attribute-matched nodes comprising a node from the first network and a node from the second network that share an attribute and wherein the nodes in the set of nodes are not included in the set of seed nodes, determine a second score using connections of attribute-matched nodes to the candidate node and to the query node, the second score including a homophily factor that corrects for a tendency of people to have friends with names from their own culture 915 — Using the first score and the second score to obtain a final score that represents a probability that an entity associated with the query node is a different entity than an entity associated with the candidate node 920 — Responsive to a candidate node having a final score that is below a threshold level, assign the entity associated with the query node in the first network is the same entity that is associated with the candidate node in the second network

```
┌─────────────────────────────────────────────────┐
│ Given a set of seed nodes comprising one or more sets of
│ matched nodes, each set of matched nodes comprising a first
│ node from the first network associated with an entity and a    ⤳ 1005
│ second node from the second networked associated with the
│ same entity, determine a first score using connections of seed
│ nodes to the candidate node and to the query node
└─────────────────────────────────────────────────┘
                          ↓
┌─────────────────────────────────────────────────┐
│ Determine a second score comprising a probability factor based
│ an attribute (e.g., name) model that estimates a probability that    ⤳ 1010
│ two entities with attributes (x, y) will be connected
└─────────────────────────────────────────────────┘
                          ↓
┌─────────────────────────────────────────────────┐
│ Using the first score and the second score to obtain a final
│ score that represents a probability that an entity associated with   ⤳ 1015
│ the query node is a different entity than an entity associated
│ with the candidate node
└─────────────────────────────────────────────────┘
                          ↓
┌─────────────────────────────────────────────────┐
│ Responsive to a candidate node having a final score that is
│ below a threshold level, assign the entity associated with the       ⤳ 1020
│ query node in the first network is the same entity that is
│ associated with the candidate node in the second network
└─────────────────────────────────────────────────┘
```

FIG. 10

SYSTEMS AND METHODS FOR IDENTIFYING ENTITIES BETWEEN NETWORKS

BACKGROUND

The world has become ever more increasingly connected. These connections are being facilitated by vast meshes of internetworked computing devices and the ubiquity of computers, laptops, smart devices, mobile phones, and the like. These internetworked computing devices form ever-present private networks and/or public networks.

Using these networked computing devices, people, governments, non-profits, organizations, and businesses form connections between and among these various groups for myriad reasons. For example, applications, such as social networks, can be formed that link entities through the networked application. Or, business entities may be interconnected to provide services, such as business or financial services.

Each of these networks may contain useful information about entities that participate in the network and about interactions between entities. It would be beneficial to be able to identify that a profile/user account in one network is owned by or associated with the same entity of a profile/user account in another network. However, given that the networks can be vast (i.e., comprising millions of discrete users), matching profiles across networks can be very challenging. The size of the networks in only one of the challenges. Added to the complexity is the fact that the information across the networks may not be the same. Furthermore, even if the information is the same, ambiguities may still exist. Consider, for example, a name associated with a profile. In social network like Facebook, LinkedIn, and Twitter, because there are millions of users, it is not uncommon for there to be several user profiles that contain the same name. Thus, without a unique identifier that is common to both profiles in different networks, it is very difficult to ascertain, for example, which profile associated with the name John Smith in one network should be linked to one of a plurality of John Smith profiles in another network.

Accordingly, what is needed are systems and methods for help associate a profile of an entity in one network with the profile of that entity in one or more other networks.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 2 depicts an example method for predicting whether an entity associated with a query profile from a first network is a different entity associated with a second profile from a second network, according to embodiments of the present document.

FIG. 3 depicts an example method of obtaining a set of candidate nodes (i.e., one or more candidate nodes) from the second network, according to embodiments of the present document.

FIG. 4 illustrates a graphical depiction of parts of two example networks where profiles of entities are represented as nodes and edges represent a connection between nodes, according to embodiments of the present document.

FIG. 5 depicts an example method for predicting whether an entity associated with a query node from a first network is a different entity associated with a second node from a second network, according to embodiments of the present document.

FIG. 7 depicts an alternative method for obtaining a predicted probability, according to embodiments of the present document.

FIG. 8 depicts another method for obtaining a predicted probability, according to embodiments of the present document.

FIG. 9 depicts yet another method for obtaining a predicted probability, according to embodiments of the present document.

FIG. 10 depicts yet another alternative method for obtaining a predicted probability regarding whether an entity associated with a query node from a first network is a different entity associated with a second node from a second network, according to embodiments of the present document.

DETAILED DESCRIPTION OF EMBODIMENTS

Figure 1:
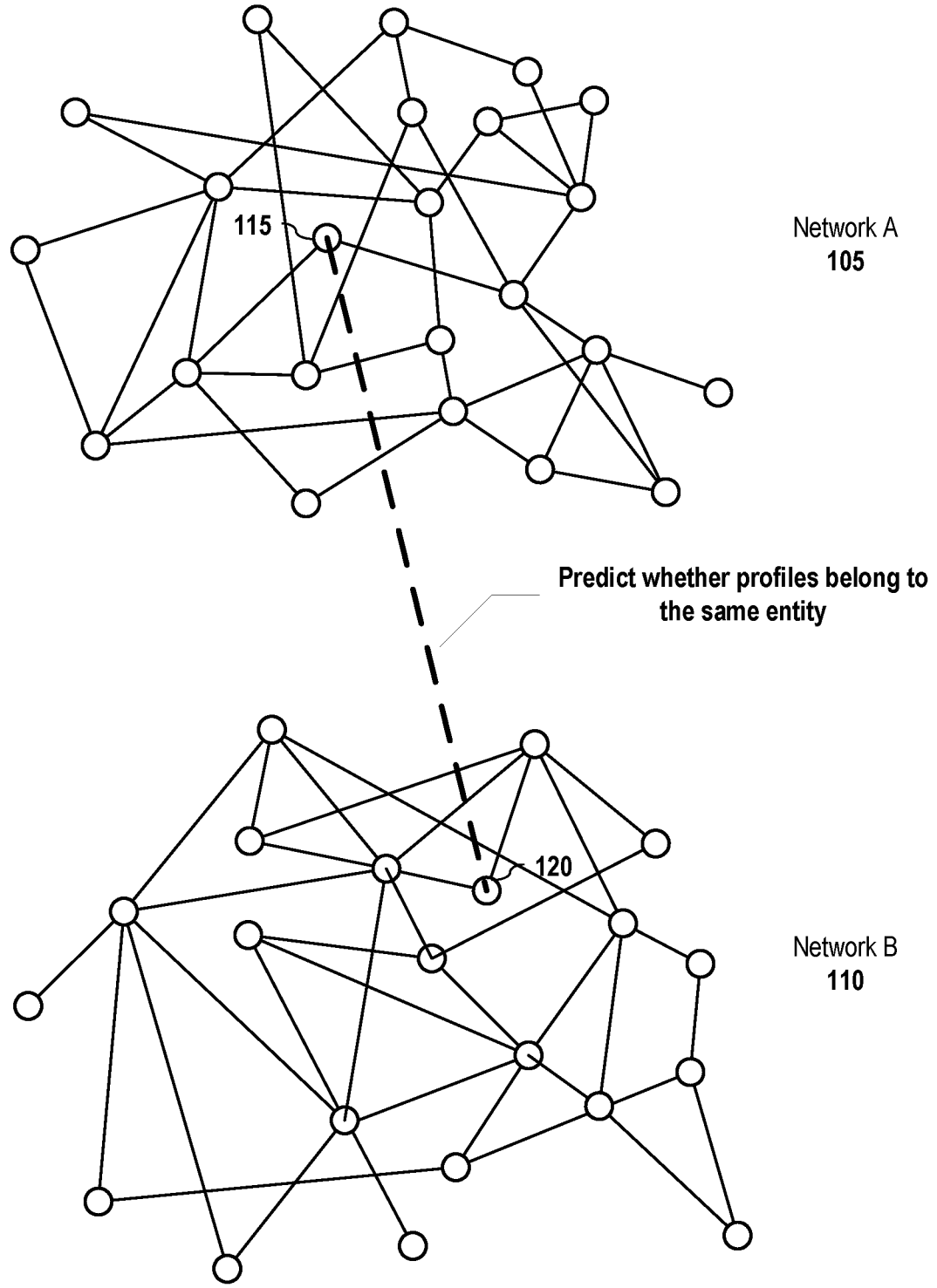
FIG. 1 illustrates a graphical depiction of two example networks where entity profiles are represented as nodes and edges represent a connection between nodes, according to embodiments of the present document.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The term "network" shall be construed broadly to mean any network, service, program, application, or the like that has users and at least some of the users interact. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Given the vast size of many networks (i.e., often millions of discrete users) and the fact that the information across networks may not be the same, increase in networks and networked services, existing approaches are often unable to identify profiles from within the same network service or from different network services that are associated with the same entity. Accordingly, disclosed herein are example embodiments of systems and methods for using one or more attributes in the networks to help gauge whether profiles in the networks are of the same entity.

In embodiments, networks that involve the interworking of entities (e.g., people, businesses, non-profits, governmental agencies, etc.) may be formed into graphs that represent the entities and at least some of the interactions between those entities. For example, in embodiments, given an interactive service or services, such as a social network, entities that are users of that service may be depicted as nodes, and edges may denote friendship, acquaintance, interactions, transactions, and the like.

FIG. 1 illustrates a graphical depiction of part of two example networks (social network A 105 and social network B 110) where entity profiles are represented as nodes (e.g., nodes 115 and 120) and edges (e.g., solid lines connecting nodes) represent a connection between nodes, according to embodiments of the present document. It should be noted that the social networks A and B may represent networks from completely different social network services or may represent networks from within the same social network service. It should be noted that the nodes, edges, or both may have one or more attributes associated with them. For example, a node, which may represent a profile, may have as associated attributes one or more of: username, email address, telephone number, first name, last name, one or more identifiers to other networks (e.g., Twitter handle, Instagram handle, etc.), images, metadata, or other data.

In embodiments, network representations, like the graphs depicted in FIG. 1, may be used to predict whether profiles in separate networks belong to the same entity. That is, for example, if a profile (e.g., node 115) in Network A 105 has a set of connections to known nodes that share at least one attribute with a profile (e.g., node 120) in Network B, these known connections may be used to ascertain whether the profile in Network A is the same entity that has the profile in Network B. For example, in embodiments, attribute-attribute (e.g., name-name) co-occurrence in networks may be used to identify corresponding profiles across networks (e.g., what is the probability that a person named Mike Smith is friends with the same set of x friends?). Thus, in embodiments, comparisons of attributes of profiles between the networks may be done to match profiles to the same entity.

B. Exemplary Method Embodiments

FIG. 2 depicts an example method for predicting whether an entity associated with a query node from a first network is a different entity associated with a second node from a second network, according to embodiments of the present document. In embodiments, a graph may be received that has already been formed. Alternatively, a graph or graphs may be formed using entities (e.g., profiles from a networking service) as nodes and connections (such as friendship, acquaintance, calls, texts, message, interactions, transactions, etc.) as edges. In embodiments, one or more of the connections may be inferred from one or more interactions between entities. In embodiments, nodes, edges, or both may include one or more attributes associated with it.

In embodiments, given a query node from a first network and a set of one or more candidate nodes from a second network, for each candidate node, a probability is predicted (205) that an entity associated with the query node is a different entity than the entity associated with the candidate node using graph features to gauge correspondence between the query and the candidate node. Since, in embodiments, the probability is based upon a null hypothesis that a query node in one network and a candidate node in a second network are associated with different entities, a low probability means that these nodes are associated with the same entity. Thus, in embodiments, responsive to a candidate node having predicted probability below a threshold level, the entity associated with the query node in the first network may be assumed (210) to be the same entity that is associated with the candidate node in the second network. In embodiments, a threshold level may be determined by finding preferred precision and recall results using a training set with profiles that are known to match. Example thresholds may be 90%, 95%, or 99%. In embodiments, when setting the threshold, it may be biased heavily towards very high precision, since an error in merging identities can propagate through the network in later iterations.

Note that in the embodiments depicted in FIG. 2, there were a set of candidate nodes from the second network. This set of candidate nodes could be all or virtually all of the nodes in the second network; however, given that most social networks comprise millions of users (i.e., millions of profiles with corresponding nodes), it would be beneficial to reduce the candidates to a smaller set of candidate nodes. One skilled in the art shall recognize that filtering may be done in any of a number of ways, including but not limited to matching first names, last names, similarity in user identifiers/handles, etc.

FIG. 3 depicts an example method of obtaining a set of candidate nodes (i.e., one or more candidate nodes) from the second network, according to embodiments of the present document. In embodiments, given an identifier for a query profile in a first network, a set of candidate profiles in the second network may be obtained by matching that identifier. It should be noted that, in embodiments, the term "match" may be construed to mean an exact match or something deemed to be a match, such as a close match or matching a variant.

Consider, by way of illustration only, the following example. If Joseph Doe is the name associated with query profile in the first network, a search may be performed in the second network to identify all nodes in that network that also have the name Joseph Doe (or a close variant, such as Joe Doe, J. Doe, etc.). It should be noted that various attributes associated with a node may be used to help generate the set of candidate notes, including but not limited to name, location, phone number, places lived, school attended, likes, hobbies, subscriptions, etc. It should also be noted that more than one attribute may be used, which may be formed into one or more complex search queries. For example, it could be that the set of candidates are those with the name Joseph Doe and who have lived in California and are not married.

In embodiments, the matching attribute may be non-textual. For example, an image from the first network, such as a profile image, may be used to match to an image associated with a node in the second network. Face recognition may be used to match the images. For example, in embodiments, a feature extractor may extract features of a face in the query image associated with a query node to generate an original feature vector of the face in the query image. In embodiments, the dimension of the original feature vector may be reduced by the Principal Component Analysis (PCA) map. In embodiments, the vectors generated by the PCA map, which are referred to as PCA feature vectors, have a dimension that is less than the original feature vectors inputted to the PCA map.

In embodiments, a filter may be used to narrow the search space so that candidate feature vectors obtained from candidate images associated with potential candidate nodes can be selected from the large number of PCA feature vectors stored in the PCA feature database. In embodiments, using an index parameter associated with the query image, a prefilter may filter out the PCA feature vectors in the PCA feature database to thereby select candidate feature vectors from the PCA feature database. In embodiments, one or more k-d trees may be used to select candidate feature vectors from the PCA feature database. One skilled in the art shall recognize that other filtering techniques may alternatively and/or additionally be employed. In embodiments, the nodes associated with the resulting set of feature vectors may be used as the set of candidate nodes.

Alternatively, additional filtering or matching may be used to further reduce the set of candidate nodes. In embodiments, a distribution calculator may calculate a distance between the query feature vector and each of the candidate feature vectors. In embodiments, the distribution calculator also selects a set of shortest distances among the distances between the query feature vector and the candidate feature vectors. Next, in embodiments, the distribution calculator generates a decision tree feature vector that includes the set of shortest distances and a distribution of the set of shortest distances.

In embodiments, the decision tree feature vector is input to a trained decision tree to obtain a score for the decision tree feature vector. In embodiments, the decision tree computes a score that represents the probability that a correct match is found. Responsive to the score exceeding a threshold value, it is determined that the person in the query image is the same person associated with the feature vector in the decision tree feature vector that had the smallest distance. In embodiments, this may be a candidate node or, as will be explained in more detail herein, it may be treated as a seed node.

In embodiments, one or more of the face recognition methods disclosed in commonly-assigned U.S. patent application Ser. No. 15/468,757, filed on 24 Mar. 2017, entitled "DETERMINING IDENTITY OF A PERSON IN A DIGITAL IMAGE," and listing as inventors Pranav Dandekar, Ashish Goel, Peter Lofgren, and Matthew Fisher, which is incorporated by reference herein in its entirety, may be used.

FIG. 4 illustrates a graphical depiction of parts of two example networks (Network A 401 and Network B 402) where profiles of entities are represented as nodes and edges (e.g., solid lines connecting nodes) represent a connection between nodes, according to embodiments of the present document. As previously mentioned, in embodiments, a null hypothesis may be tested that predicts a probability, given certain connections in the networks, that a query node, $N_{Query}$ 405, in Network A 401 is a different entity than a candidate node, $N_{candidate}$ 450, in another network, Network B 402.

FIG. 5 depicts an example method for predicting whether an entity associated with a query node from a first network is a different entity associated with a second node from a second network, according to embodiments of the present document. As shown in FIG. 5, a set of seed nodes comprising one or more sets of matched nodes, each set of matched nodes comprising a first node from the first network (e.g., Network A 401) associated with an entity and a second node from the second network (e.g., Network B 450) associated with the same entity, are given or obtained (505). As discussed above, these seed nodes may be obtained by matching one or more identifying attributes in nodes' profiles. Alternatively, or additionally, the nodes may have been matched from a prior iteration of one of the methods described herein, which is discussed in more detail with respect to FIG. 11. In any event, a set of seed nodes comprising one or more sets of matched nodes are identified.

For purposes of illustration, assume that in FIG. 4 node 410 in Network A has been matched to node $N_{2-1}$ 455 in Network B; that is, it is deemed that the profiles for both of those nodes are owned by the same entity, for example, Ida Smith. And, therefore, these sets of matched nodes may be used as "seed" nodes, whose connections to other nodes in the networks may be used to help find other matched nodes.

Returning to FIG. 5, in embodiments, given a set of nodes comprising one or more sets of attribute-matched nodes, each set of attribute-matched nodes comprising a node from the first network and a node from the second network that share an attribute and wherein the nodes in the set of attribute-matched nodes are not included in the set of seed nodes, a second score may be determined (510) using connections of attribute-matched nodes to the candidate node and to the query node.

Assume, for purposes of illustration that nodes, $N_{1-1}$ 410, $N_{1-3}$ 420, and $N_{2-8}$ 490 each have the same name attribute (in this example it is name attribute but it could any other attribute associated with a node) and that nodes $N_{1-2}$ 415 and $N_{2-2}$ 460 share the same name (but different from $N_{1-1}$ 410, $N_{1-3}$ 420, and $N_{2-8}$ 490), and all are connected to either the query node, $N_{Query}$ 405 or the candidate node, $N_{candidate}$ 450. That is, the attribute-matched nodes $N_{1-1}$ 410, $N_{1-3}$ 420, and $N_{2-8}$ 490 share an attribute and each has a connection to either the query node or the candidate node, and the attribute-matched nodes $N_{1-2}$ 415 and $N_{2-2}$ 460 share an attribute and each has a connection to either the query node or the candidate node. Note, however, that in embodiments, $N_{1-1}$ 410 will be excluded from the set of attribute-matched nodes because it was included in the calculation for the first score calculation; thus, in this example, $N_{1-3}$ 420 and $N_{2-8}$ 490 remain as one set of attribute-matched nodes and $N_{1-2}$ 415 and $N_{2-2}$ 460 remains as another set of attribute-matched nodes.

Then, in embodiments, the first score and the second score are combined (515) to obtain a final score that represents a probability that an entity associated with the query node is a different entity than an entity associated with the candidate node. In embodiments, the combination may be a simple multiplication or it may include one or more weights, one or more other factors, or both.

Having obtained a final score or probability value, this final score may then be used to check the null hypothesis. Responsive to a candidate node having a final score that is below a threshold level, it may be concluded (520) that the entity associated with the query node in the first network is the same entity that is associated with the candidate node in the second network. In embodiments, a threshold level may be determined by finding preferred precision and recall results using a training set. Example thresholds may be 90%, 95%, or 99%. In embodiments, a very high confidence that entities are the same may be strongly preferred, which may bias towards very high precision.

Figure 6:
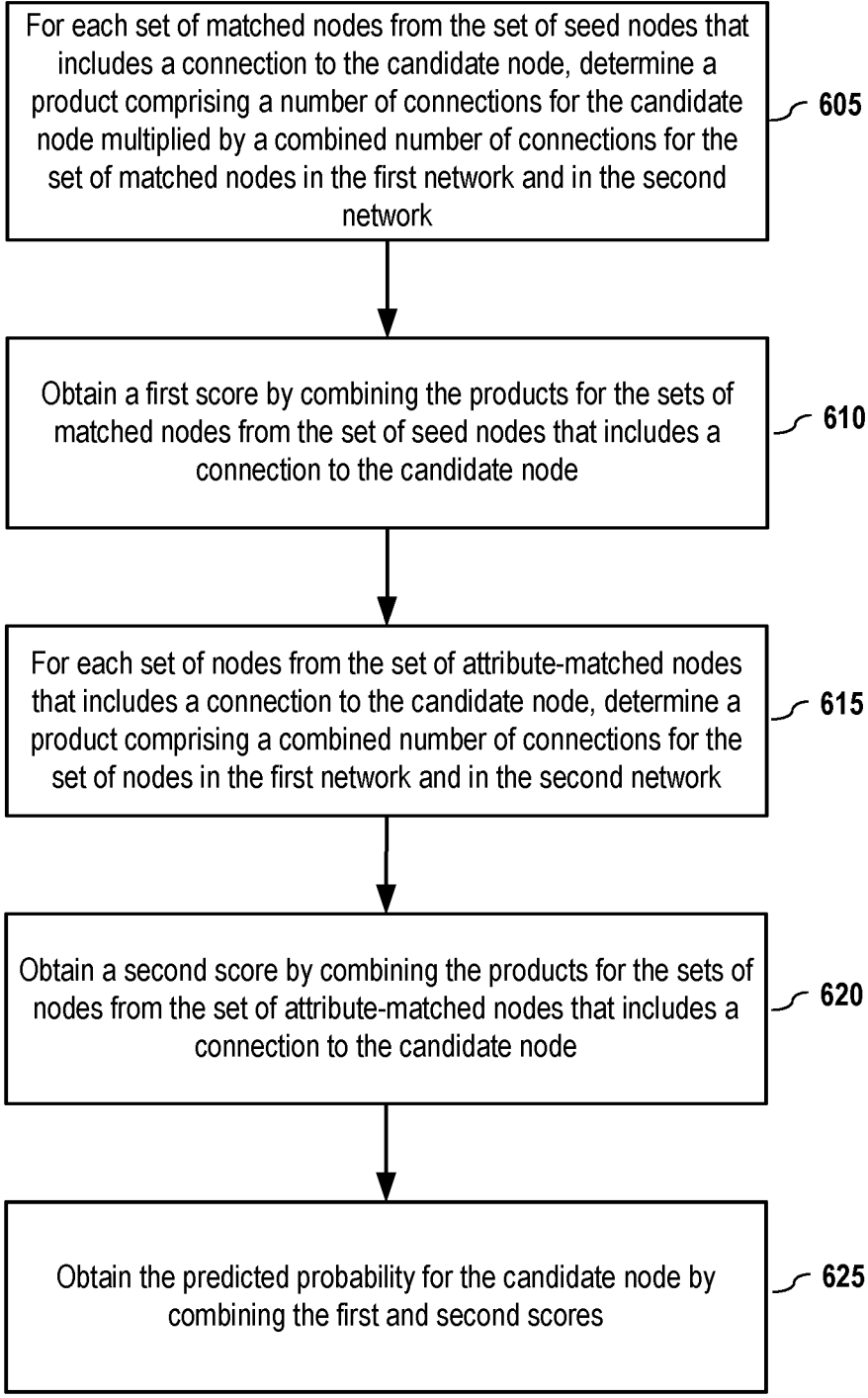
FIG. 6 depicts an example method for obtaining a predicted probability regarding whether an entity associated with a query node from a first network is a different entity than one associated with a second node from a second network, according to embodiments of the present document.

Responsive to a candidate node not having a final score that is below a threshold level, it may be concluded that the entity associated with the query node in the first network is a different entity that is associated with the candidate node in the second network FIG. 6 depicts an example method for obtaining a predicted probability regarding whether an entity associated with a query node from a first network is a different entity than one associated with a second node from a second network, according to embodiments of the present document. In embodiments, the nodes and connections may be used to predict a probability as the combination of a first product over nodes which are known and are connected to the query node and connected to a candidate node and a second product over nodes that share an attribute and are connected to the query node or connected to a candidate node but were not included in the first product. For example, in embodiments, a p-value may be obtained using the following formulas:

$$p\text{-value} = \text{First Score} * \text{Second Score} \quad (1)$$

In embodiments, the first score may be determined as a product over matched nodes that are connected to the query node and to a candidate node. In embodiments, for each set of matched nodes from a set of seed nodes, a product may be computed (605) comprising a number of connections for the candidate node multiplied by a combined number of connections for the set of matched nodes in the first network and in the second network. The first score may be obtained (610) by combining the products for the sets of matched nodes from the set of seed nodes that includes a connection to the candidate node. Equation (2) depicts an example equation embodiment for determining a first score value:

$$\text{Score}_{exact} = \prod_m \frac{[\text{Candidate's Connection Count} * \text{Matched Nodes' Total Connections in both Networks}]}{(\text{Total Connections in Both Networks})}, \quad (2)$$

where m=set(s) of matched nodes. For example, given a set of seed nodes, a first score (e.g., $\text{Score}_{exact}$) may be determined or assessed using connections of seed nodes to the candidate node and to the query node. Using the graphical depiction in FIG. 4 as an illustration with the set of seed nodes comprises two sets of matched nodes (e.g., $N_{1-1}$ 410 matched to $N_{2-1}$ 455 and $N_{1-4}$ 425 matched to $N_{2-3}$ 465), the $\text{Score}_{exact}$ would be as follows:

$$\text{Score}_{exact} = \frac{[4*(3+4)]}{[15+12]} * \frac{[4*(2+3)]}{[15+12]}$$

In embodiments, the second score may be determined relative to nodes that have a matching attribute and are connected to the query node and to a candidate node. Thus, in embodiments, for each set of nodes from a set of attribute-matched nodes that includes a connection to the candidate node, a product may be determined (615) comprising a combined number of connections for the set of nodes in the first network and in the second network. Then, the second value may be obtained (620) by combining the products for the sets of nodes from the set of attribute-matched nodes that includes a connection to the candidate node. Equation (3) depicts an example equation for determining a second score value:

$$\text{Score}_{attribute} = \prod_k \frac{\left[\begin{array}{c}\text{Total Connections in both Networks}\\ \text{for Attributed-Matched Nodes}\end{array}\right]}{\text{Total Connections in Both Networks}} \quad (3)$$

where k=sets of nodes that share an attribute and are not included in the set of seed nodes.

Assume, for purposes of illustration that nodes, $N_{1-1}$ 410, $N_{1-3}$ 420, and $N_{2-8}$ 490 share an attribute and that nodes $N_{1-2}$ 415 and $N_{2-2}$ 460 also share an attribute (but different from $N_{1-1}$ 410, $N_{1-3}$ 420, and $N_{2-8}$ 490), and all are connected to either the query node, $N_{Query}$ 405 or the candidate node, $N_{candidate}$ 450. In embodiments, $N_{1-1}$ 410 will be excluded from the set of attribute-matched nodes because it was included in the calculation for $\text{Score}_{exact}$; thus, in this example, $N_{1-3}$ 420 and $N_{2-8}$ 490 remain as one set of attribute-matched nodes and $N_{1-2}$ 415 and $N_{2-2}$ 460 remains as another set of attribute-matched nodes. In embodiments, the second score may be determined as follows:

$$\text{Score}_{attribute} = \frac{[5+3]}{[15+12]} * \frac{[4+4]}{[15+12]}$$

Then, in embodiments, the first score (e.g., $\text{Score}_{exact}$) and the second score (e.g., $\text{Score}_{attribute}$) may be combined to obtain (625) a final score that represents a probability that an entity associated with the query node is a different entity than an entity associated with the candidate node. In embodiments, the combination may be a simple multiplication as shown in equation (1) or it may include one or more weights, one or more other factors, or both.

FIG. 7 depicts an alternative method for obtaining a predicted probability, according to embodiments of the present document. In embodiments, the combined probability may be weighted (705) by the number of nodes in the query node's network that share a profile attribute (e.g., name) with the query node to obtain the final predicted probability that the entity associated with the query node is a different entity than the entity associated with the candidate node.

For example, given trying to match using name of a query node with a common name (e.g., John Smith), and assume a large number of nodes (e.g., one million nodes) in the source network have that same name. Furthermore, suppose for some particular node with the name John Smith in the second network, this method may be used to compute a p-score having a small value (e.g., $2.3 \times 10^{-9}$). Because every one of the nodes named John Smith in the first network has a risk of creating a false match, in this variation the p-score may be adjusted by multiplying by the number of John Smith's in the first network, $1 \times 10^6$, to get an adjusted p-score of, $1 \times 10^6 * 2.3 \times 10^{-9} = 2.3 \times 10^{-3}$. For a fixed p-value threshold, this variation leads to fewer matches between networks but decreases the number of false matches. In embodiments, a Bonferroni correction method may be used for similar effect.

FIG. 8 depicts yet another alternative method for obtaining a predicted probability, according to embodiments of the present document. In embodiments, the "connection" to a candidate node and to query node may be interpreted to mean more than just a direct connection. For example, in embodiments, seed nodes could be considered if they are within a set number of hops from the query node and a set number of hops from a candidate node. It should be noted that the set number of hops may be the same for both the query and candidate node (e.g., two hops); or alternatively, it may be a different number of hops. For example, a seed node may be considered if within two hops of the query node and within 4 hops of the candidate node.

FIG. 9 depicts yet another alternative method for obtaining a predicted probability, according to embodiments of the present document. In embodiments, the second score, particularly when the attribute is name, location, hobby, or the like, may include a homophily factor, which corrects for or utilizes the observation that people tend to associate with those whom they share similarities. Because entities tend to associate with other entities that are similar or share similarities, one or more such similarities in attributes may be expected. For example, a person may tend to have friends with names from their own culture or share similar interests, attended the same schools, etc. Alternatively or additionally, in embodiments, a homophily factor may be considered as a likelihood that two different people with the same attribute of interest (e.g., name, hobby, locality, or whichever attribute of interest) are connected to the same person in a network. Using name attribute as an example, an entity named Santiago is more likely to have a friend with a Spanish-culture name like Jose than a randomly chosen name like Pranav or Xin.

In embodiments, given a set of seed nodes comprising one or more sets of matched nodes, each set of matched nodes comprising a first node from the first network associated with an entity and a second node from the second networked associated with the same entity, a first score may be determined (905) using connections of seed nodes to the candidate node and to the query node, as previously discussed.

In embodiments, given a set of attribute-matched nodes comprising one or more sets of nodes, each set of nodes comprising a node from the first network and a node from the second network that share an attribute and wherein the nodes in the set of attribute-matched nodes are not included in the set of seed nodes, a second score may be determined (910) using connections of attribute-matched nodes to the candidate node and to the query node. This second score may be determined as previously discussed, however, in embodiments, the second score includes a homophily factor. In embodiments, the second score, including a homophily factor, may be determined as follows:

$$\text{Score}_{attribute} = \text{Score}_{attribute} \text{ of Eq.(3)} * \text{Homophily Factor} \quad (4)$$

In embodiments in which name was the attribute, a homophily factor of 30 may be used, although other values may be used. In embodiments, this may be calculated as the increase in likelihood that person A and B are connected in a network given that A and C are connected, and that B and C have the same name. A number of 30 was determined empirically, although one skilled in the art shall recognize that other definitions of the homophily factor depending upon attribute or attributes of interest may be used, which may lead to a different homophily factor.

As before, the first score and the second score (which include a homophily factor or factors) may then be used to obtain (915) a final score that represents a probability that an entity associated with the query node is a different entity than an entity associated with the candidate node. And, responsive to a candidate node having a final score that is below a threshold level, the entity associated with the query node in the first network may be deemed (920) to be the same entity that is associated with the candidate node in the second network. Conversely, responsive to a candidate node not having a final score that is below a threshold level, the entity associated with the query node in the first network may not be deemed to be the same entity that is associated with the candidate node in the second network.

FIG. 10 depicts yet another alternative method for obtaining a predicted probability regarding whether an entity associated with a query node from a first network is a different entity associated with a second node from a second network, according to embodiments of the present document. In embodiments, given a set of seed nodes comprising one or more sets of matched nodes, each set of matched nodes comprising a first node from the first network associated with an entity and a second node from the second networked associated with the same entity, a first score may be determined (1005) using connections of seed nodes to the candidate node and to the query node. And, in embodiments, a second score comprising a probability factor based upon an attribute model that estimates a probability that two entities with attributes (x, y) will be connected may also be determined (1010).

For example, in embodiments, a name-name co-occurrence model may be used, which estimates the probability that two people with names (x, y) will be connected. An example embodiment model is a direct model, which may be represented as:

$$Pr[(x, y) \text{ will be connected}] = \quad (5)$$

-continued $$\frac{\text{\# of Nodes in Network } A \text{ with name } x \text{ with connection to } y}{\text{Number of connections in Network } A}$$

In an alternative embodiment, matrix factorization or Latent Dirichlet allocation may be used to infer latent cultures for each name, which could be used as a model. Specifically, in embodiments, a matrix may be formed where each row and each column correspond to a name, and an entry (i, j) represents:

$$\frac{\text{Number of Connections between Name } i \& j}{\text{Total Number of Connections}}$$

The matrix may be factorized to compute a low-rank approximation to it, and then the entry (i, j) may be used in the low-rank approximation as an estimate of the probability that (i, j) are connected.

In embodiments, the first score and the second score may then be used (1015) to obtain a combined score that represents a final probability that an entity associated with the query node is a different entity than an entity associated with the candidate node. As before, responsive to a candidate node having a final score that is below a threshold level, the entity associated with the query node in the first network may be assumed to be the same entity that is associated with the candidate node in the second network.

Figure 11:
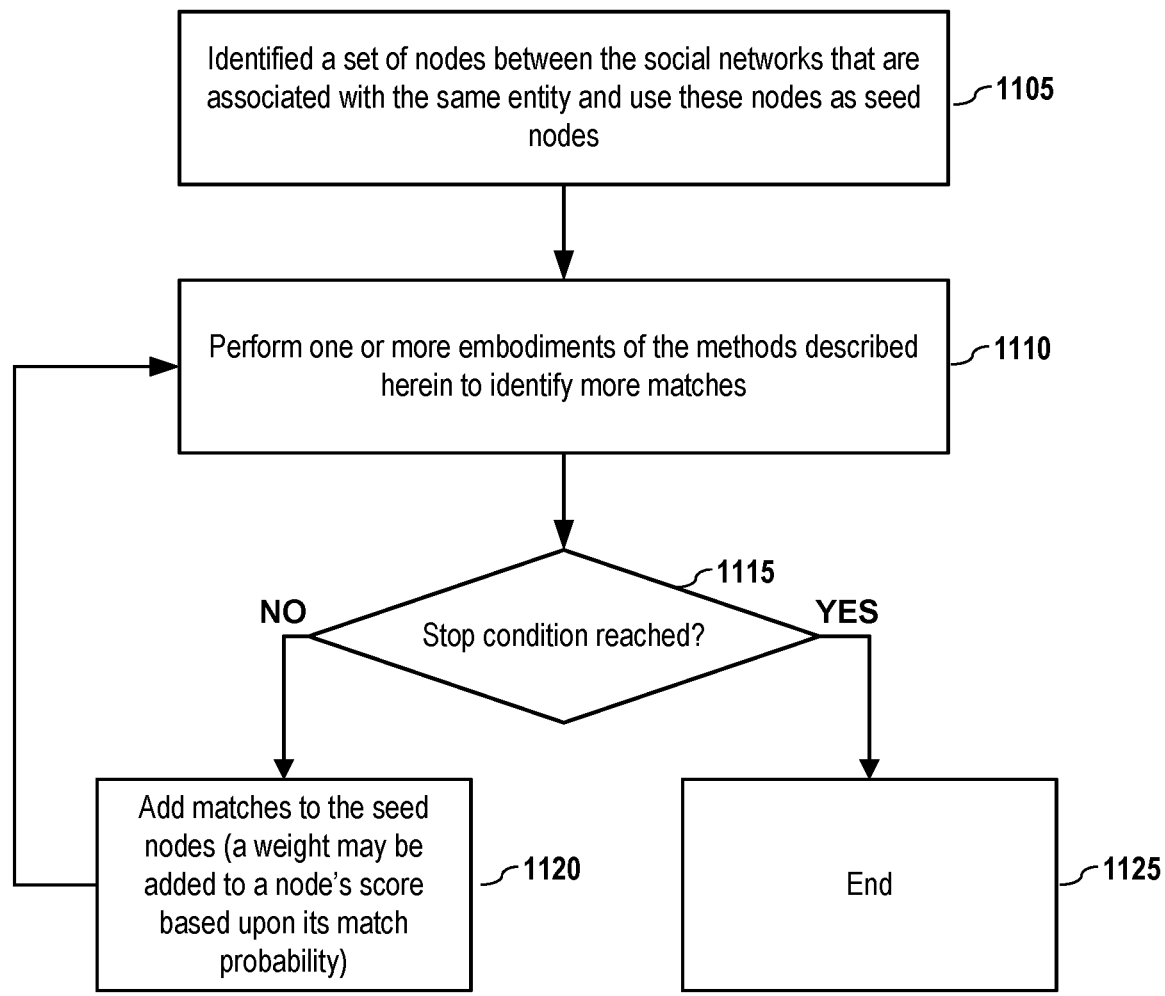
FIG. 11 depicts a method for iteratively or recursively attempting to match a query node to one or more candidate nodes, according to embodiments of the present document.

It should be noted that, in embodiments, any of the approaches for matching a query node to a candidate node may be recursively performed, in which matched nodes are added to the set of seed nodes. FIG. 11 depicts a method for iteratively or recursively attempting to match a query node to one or more candidate nodes, according to embodiments of the present document.

As depicted in FIG. 11, a set of nodes that are deemed (1105) associated with the same entity but are in different networks are used as seed nodes. Seed nodes may be identified by matching one or more unique attributes of the profiles, such as username, email address, telephone number, name, one or more identifiers of other networks (e.g., Twitter name, Instagram name, etc.), images, metadata, or other data. Then, one or more embodiments of the methods described herein may be performed (1110) to identify more matching nodes.

In embodiments, a stop condition is checked (1115). A stop condition may be a number of iterations, failure of any matches to be found, or the like. If a stop condition is not reached, the nodes matched at step 1110 can be added to the seed nodes and the process may be repeated by returning to step 1110. In embodiments, a weight may be added to a node's score; for example, the matched nodes' match probability may be used as a weight factor. However, if a stop condition has been reached, the process may end, with the matched nodes that have been found.

It should be noted that being able to match profiles within the same network service or between different network services provides several benefits for the functioning and operations of such network services. For example, having multiple profiles can result in inefficient service operations, excess bandwidth usage to the support the services, excess memory usage—not to mention confusion between entities that use the services as to which profile to interact with. Also, making connection across different network services can provide for more complete view of the entity and can result in complementary services being offered as a result of the connection across networks. For example, better personalize content, products, and the like can be delivered to an entity because a more complete picture is obtained for the entity. Also, one or more embodiments may be used to identify with better accuracy whether that entity is reputable, trustworthy, creditworthy (depending on the application) or conversely, fraudulent, disreputable, or otherwise nefarious. In addition, one or more embodiment may be used to make access to an application easier or more seamless for that entity (e.g., a user can login into an application with a different application's login credentials, but the application will know that the user is the correct entity). One skilled in the art shall recognize a number of other technical benefits, which can be achieved using one or more of the embodiments herein.

C. System Embodiments

In embodiments, aspects of the present patent document may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 12:
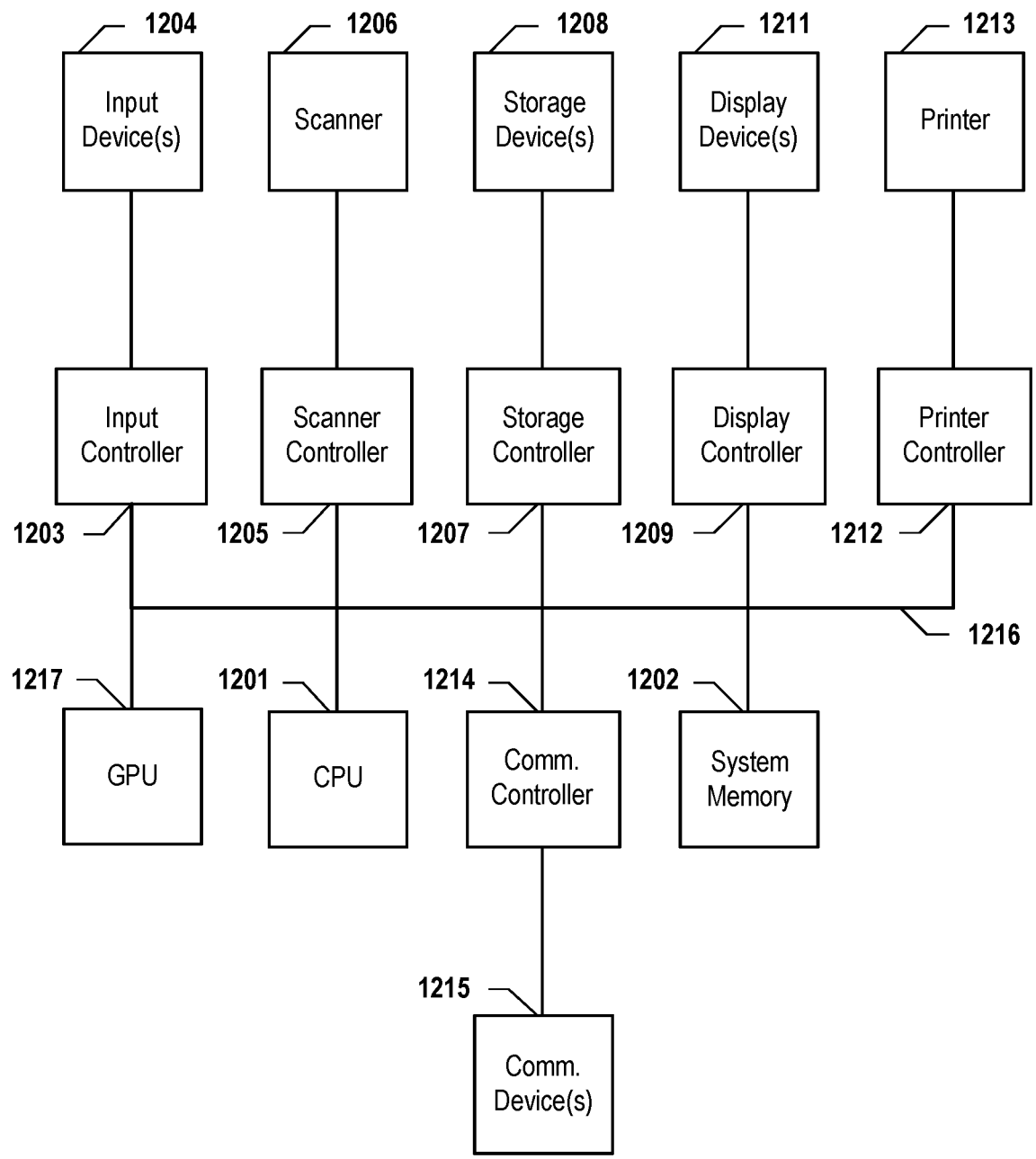
FIG. 12 depicts a simplified block diagram of a computing device/information handling system, in accordance with embodiments of the present document.

FIG. 12 depicts a simplified block diagram of a computing device/information handling system (or computing system) according to embodiments of the present disclosure. It will be understood that the functionalities shown for system 1200 may operate to support various embodiments of an information handling system—although it shall be understood that an information handling system may be differently configured and include different components.

As illustrated in FIG. 12, system 1200 includes one or more central processing units (CPU) 1201 that provides computing resources and controls the computer. CPU 1201 may be implemented with a microprocessor or the like, and may also include one or more graphics processing units (GPU) 1217 and/or a floating point coprocessor for mathematical computations. System 1200 may also include a system memory 1202, which may be in the form of random-access memory (RAM), read-only memory (ROM), or both.

A number of controllers and peripheral devices may also be provided, as shown in FIG. 12. An input controller 1203 represents an interface to various input device(s) 1204, such as a keyboard, mouse, or stylus. There may also be a scanner controller 1205, which communicates with a scanner 1206. System 1200 may also include a storage controller 1207 for interfacing with one or more storage devices 1208 each of which includes a storage medium such as magnetic tape or disk, or an optical medium that might be used to record programs of instructions for operating systems, utilities, and applications, which may include embodiments of programs that implement various aspects of the present invention. Storage device(s) 1208 may also be used to store processed data or data to be processed in accordance with the invention. System 1200 may also include a display controller 1209 for providing an interface to a display device 1211, which may be a cathode ray tube (CRT), a thin film transistor (TFT) display, or other type of display. The computing system 1200 may also include a printer controller 1212 for communicating with a printer 1213. A communications controller 1214 may interface with one or more communication devices 1215, which enables system 1200 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1216, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of the claims, below, may be arranged differently including having multiple dependencies, configurations, and combinations.

What is claimed is:

1. A computer-implemented method, comprising:
   generating a feature vector for a query node from a first network, the feature vector including at least one feature determined based on a query image associated with the query node;
   generating a reduced feature vector based on a principal component analysis (PCA) map that utilizes the feature vector as input;
   selecting, using one or more k-d trees, a set of candidate feature vectors from a PCA feature database;
   determining a set of candidate nodes in a second network associated with at least one candidate feature vector from the set of candidate feature vectors, the second network comprising a set of nodes, each node from the set of nodes associated with a candidate image;
   for each candidate node from the set of candidate nodes, predicting a probability that assesses whether the query node is a match with the candidate node using data associated with at least one of the nodes in the first and second networks that are connected within a set number of nodes to the query node or within a set number of nodes to the candidate node, the predicting:
   for a set of seed nodes comprising at least one set of matched nodes, each set of matched nodes comprising a first node from the first network and is associated with an entity and a second node from the second network and is associated with a same entity, determining a first score using connections of seed nodes to the candidate node and to the query node;

for a set of attribute-matched nodes comprising at least one set of nodes, each set of nodes comprising a node from the first network and a node from the second network that share an attribute and the nodes in the set of attribute-matched nodes are not included in the set of seed nodes, determining a second score using connections of attribute-matched nodes to the candidate node and to the query node; and obtaining a combined score that represents a predicted probability that an entity associated with the query node is a different entity than an entity associated with the candidate node, the combined score based at least in part on multiplying the first score with the second score;

responsive to the candidate node having a predicted probability within a threshold range, matching the query node in the first network with the candidate node in the second network;

merging, with particular data from the query node, data from the matched candidate node; and granting at least one network service for an account associated with the query node based at least in part on the data from the merged data.

2. The computer-implemented method of claim 1, wherein the first score is based at least in part on multiplying a number of connections for the candidate node with a combined number of connections for the set of matched nodes in the first network and in the second network.

3. The computer-implemented method of claim 1, wherein the first network and the second network are portions of a same network, and further comprising:

calculating a distance between the feature vector and each of the candidate feature vectors, selecting a set of shortest distances among a set of distances between the feature vector and the candidate feature vectors, and generating a decision tree feature vector that includes the set of shortest distances and a distribution of the set of shortest distances.

4. The computer-implemented method of claim 1, wherein obtaining the combined score comprises:

for each set of matched nodes from the set of seed nodes that includes a connection to the candidate node, determining a product comprising a number of connections for the candidate node multiplied by a combined number of connections for the set of matched nodes in the first network and in the second network;

obtaining a first value by combining the products for the sets of matched nodes from the set of seed nodes that includes a connection to the candidate node;

for each set of nodes from the set of attribute-matched nodes that includes a connection to the candidate node, determining a product comprising a combined number of connections for the set of nodes in the first network and in the second network;

obtaining a second value by combining the products for the sets of nodes from the set of attribute-matched nodes that includes a connection to the candidate node; and obtaining the predicted probability for the candidate node by combining the first and second values.

5. The computer-implemented method of claim 4, wherein the obtaining of the predicted probability for the candidate node by combining the first and second values comprises multiplying the first value, the second values, and a number of nodes in the first network that share a profile attribute with the query node.

6. The computer-implemented method of claim 4, wherein the obtaining of the predicted probability for the candidate node by combining the first and second values comprises multiplying the first value, the second values, and a homophily factor that accounts for one or more expected similarities between entities associated with the query node and at least one of the nodes in the second network.

7. The computer-implemented method of claim 4 further comprising: responsive to matching a candidate node to the query node, adding the matched candidate node and query node to the set of seed nodes.

8. A computer-implemented method, comprising:

generating a feature vector for a query node from a first network, the feature vector including at least one feature determined based on a query image associated with the query node;

generating a reduced feature vector based on a principal component analysis (PCA) map that utilizes the feature vector as input;

selecting, using one or more k-d trees, a set of candidate feature vectors from a PCA feature database;

determining a set of candidate nodes in a second network associated with at least one candidate feature vector from the set of candidate feature vectors, the second network comprising a set of nodes, each node from the set of nodes associated with a candidate image;

for each candidate node from the set of candidate nodes, predicting a probability that an entity associated with the query node is a different entity than the entity associated with the candidate node using graph features associated with the query and associated with the candidate node, the predicting comprising:

for a set of seed nodes comprising one or more sets of matched nodes, each set of matched nodes comprising a first node from a first network and is associated with an entity and a second node from the second network and is associated with the same entity, determining a first score using connections of seed nodes to the candidate node and to the query node, the first score based at least in part on multiplying a number of connections for the candidate node with a combined number of connections for the set of matched nodes in the first network and in the second network;

for a set of attribute-matched nodes comprising at least one set of nodes, each set of nodes comprising a node from the first network and a node from the second network that share an attribute and the nodes in the set of attribute-matched nodes are not included in the set of seed nodes, determining a second score using connections of attribute-matched nodes to the candidate node and to the query node; and obtaining a combined score that represents a predicted probability that an entity associated with the query node is a different entity than an entity associated with the candidate node, the combined score based at least in part on multiplying the first score with the second score; and responsive to the candidate node having a predicted probability that is below a threshold level:

assuming the entity associated with the query node in the first network is the same entity that is associated with the candidate node in the second network;

merging, with particular data from the query node, data from the matched candidate node; and granting at least one network service for an account associated with the query node based at least in part on the data from the merged data.

9. The computer-implemented method of claim 8 wherein the first score is based at least in part on multiplying a number of connections for the candidate node with a combined number of connections for the set of matched nodes in the first network and in the second network.

10. The computer-implemented method of claim 8 wherein merging one or more pieces of data from the matched candidate node comprises:
merging the matched candidate node and the query node into a single node; and
removing either the matched candidate node or the query node.

11. The computer-implemented method of claim 8 wherein obtaining the combined score comprises:
for each set of matched nodes from the set of seed nodes that includes a connection to the candidate node, determining a product comprising a number of connections for the candidate node multiplied by a combined number of connections for the set of matched nodes in the first network and in the second network;
obtaining a first value by combining the products for the sets of matched nodes from the set of seed nodes that includes a connection to the candidate node;
for each set of nodes from the set of attribute-matched nodes that includes a connection to the candidate node, determining a product comprising a combined number of connections for the set of nodes in the first network and in the second network;
obtaining a second value by combining the products for the sets of nodes from the set of attribute-matched nodes that includes a connection to the candidate node; and
obtaining the predicted probability for the candidate node by combining the first and second values.

12. The computer-implemented method of claim 11, wherein:
determining a product for a set of matched nodes comprises weighting the product by a reciprocal of a total number of connections in the first and second networks,
determining a product for a set of nodes comprises weighting the product by the reciprocal of the total number of connections in the first and second networks, and
obtaining the predicted probability for the candidate node by combining the first and second values comprises multiplying the first and second values.

13. The computer-implemented method of claim 11, wherein obtaining the predicted probability for the candidate node by combining the first and second values comprises multiplying the first value, the second values, and a number of nodes in the first network that share a profile attribute with the query node.

14. The computer-implemented method of claim 11, wherein obtaining the predicted probability for the candidate node by combining the first and second values comprises multiplying the first value, the second values, and a homophily factor that accounts for one or more expected similarities between entities associated with the query node and at least one of the nodes in the second network.

15. The computer-implemented method of claim 8 wherein, the connections of seed nodes to the candidate node or to the query node are within two hops.

16. A system, comprising:
one or more processors; and
a non-transitory computer-readable medium or media comprising one or more sequences of instructions which, when executed by the one or more processors, causes steps to be performed comprising:
generating a feature vector for a query node from a first network, the feature vector including at least one feature determined based on a query image associated with the query node;
generating a reduced feature vector based on a principal component analysis (PCA) map that utilizes the feature vector as input
selecting, using one or more k-d trees, a set of candidate feature vectors from a PCA feature database;
determining a set of candidate nodes in a second network associated with at least one candidate feature vector from the set of candidate feature vectors, the second network comprising a set of nodes, each node from the set of nodes associated with a candidate image;
for each candidate node from the set of candidate nodes, predicting a probability that an entity associated with the query node is a different entity than the entity associated with a candidate node using graph features associated with the query and associated with the candidate node, the predicting comprising:
for a set of seed nodes comprising at least one set of matched nodes, each set of matched nodes comprising a first node from a first network and is associated with an entity and a second node from the second network and is associated with a same entity, determining a first score using connections of seed nodes to the candidate node and to the query node, the first score based at least in part on multiplying a number of connections for the candidate node with a combined number of connections for the set of matched nodes in the first network and in the second network;
for a set of attribute-matched nodes comprising at least one set of nodes, each set of nodes comprising a node from the first network and a node from the second network that share an attribute and the nodes in the set of attribute-matched nodes are not included in the set of seed nodes, determining a second score using connections of attribute-matched nodes to the candidate node and to the query node; and
obtaining a combined score that represents a predicted probability that an entity associated with the query node is a different entity than an entity associated with the candidate node, the combined score based at least in part on multiplying the first score with the second score; and
responsive to the candidate node having a predicted probability that is below a threshold level:
assuming the entity associated with the query node in the first network is the same entity that is associated with the candidate node in the second network; and
granting one or more network services to a user account associated with the query node.

17. The system of claim 16 wherein the first score is based at least in part on multiplying a number of connections for the candidate node with a combined number of connections for the set of matched nodes in the first network and in the second network.

18. The system of claim 16 wherein, the combined score for a candidate node is obtained by performing the steps comprising:
for each set of matched nodes from the set of seed nodes that includes a connection to the candidate node, determining a product comprising a number of connections for the candidate node multiplied by a combined number of connections for the set of matched nodes in the first network and in the second network;

obtaining a first value by combining the products for the sets of matched nodes from the set of seed nodes that includes a connection to the candidate node;

for each set of nodes from the set of attribute-matched nodes that includes a connection to the candidate node, determining a product comprising a combined number of connections for the set of nodes in the first network and in the second network;

obtaining a second value by combining the products for the sets of nodes from the set of attribute-matched nodes that includes a connection to the candidate node; and obtaining the predicted probability for the candidate node by combining the first and second values.

19. The system of claim 18 wherein, obtaining the predicted probability for the candidate node by combining the first and second values comprises multiplying the first value, the second values, and a number of nodes in the first network that share a profile attribute with the query node.

20. The system of claim 18 wherein, obtaining the predicted probability for the candidate node by combining the first and second values comprises multiplying the first value, the second values, and a homophily factor that accounts for one or more expected similarities between entities associated with the query node and at least one of the nodes in the second network.

* * * * *